(12) United States Patent
Silverstein et al.

(10) Patent No.: US 8,235,531 B2
(45) Date of Patent: Aug. 7, 2012

(54) OPTICAL INTERFERENCE REDUCING ELEMENT FOR LASER PROJECTION

(75) Inventors: Barry D. Silverstein, Rochester, NY (US); Gary E. Nothhard, Hilton, NY (US); Joseph R. Bietry, Rochester, NY (US); Robert Metzger, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 464 days.

(21) Appl. No.: 12/488,661

(22) Filed: Jun. 22, 2009

(65) Prior Publication Data

US 2010/0321639 A1     Dec. 23, 2010

(51) Int. Cl.
  *G03B 21/00*  (2006.01)
  *G03B 21/26*  (2006.01)
(52) U.S. Cl. ............................................. 353/33; 353/94
(58) Field of Classification Search .................... 353/31, 353/33, 38, 94; 359/599, 618–619, 707
See application file for complete search history.

(56) References Cited

U.S. PATENT DOCUMENTS

| | | |
|---|---|---|
| 4,441,791 A | 4/1984 | Hornbeck |
| 5,535,047 A | 7/1996 | Hornbeck |
| 5,600,383 A | 2/1997 | Hornbeck |
| 5,808,795 A | 9/1998 | Shimomura et al. |
| 5,907,437 A | 5/1999 | Sprotbery et al. |
| 6,445,487 B1 | 9/2002 | Roddy et al. |
| 6,594,090 B2 * | 7/2003 | Kruschwitz et al. ......... 359/707 |
| 6,600,590 B2 | 7/2003 | Roddy et al. |
| 6,625,381 B2 | 9/2003 | Roddy et al. |
| 6,747,781 B2 | 6/2004 | Trisnadi |
| 6,975,294 B2 | 12/2005 | Manni et al. |
| 7,116,017 B2 | 10/2006 | Ji et al. |
| 7,244,028 B2 | 7/2007 | Govorkov et al. |
| 7,271,962 B2 * | 9/2007 | Kasazumi et al. ............ 359/707 |
| 7,296,987 B2 | 11/2007 | Rossi et al. |
| 7,379,651 B2 * | 5/2008 | Abu-Ageel .................... 385/146 |
| 7,646,518 B2 * | 1/2010 | Kasazumi ................. 359/196.1 |
| 7,997,737 B2 * | 8/2011 | Itoh et al. ........................ 353/79 |
| 2002/0114057 A1 | 8/2002 | Roddy et al. |

(Continued)

FOREIGN PATENT DOCUMENTS

EP    1 292 134 A2    3/2003

(Continued)

OTHER PUBLICATIONS

"High Power Extended Vertical Cavity Surface Emitting Diode Lasers and Arrays and Their Applications", by Aram Mooradian et al., Micro-Optics Conference, Tokyo, Nov. 2, 2005.

(Continued)

*Primary Examiner* — Tony Ko
*Assistant Examiner* — Jori S Reilly-Diakun
(74) *Attorney, Agent, or Firm* — Kevin E. Spaulding

(57) ABSTRACT

A laser projection system comprising a laser source system configured to emit coherent light, an optical integrating system configured to uniformize coherent light it receives, a randomizing optical element configured to spatially move over time in order to temporally randomize the phase, angle or spatial location of coherent light it receives, an image forming system configured to interact with laser light that has been both uniformized by the optical integrating system and randomized by the randomizing optical element, thereby forming a laser light image, and a projection system configured to project the laser light image onto a viewing screen.

9 Claims, 9 Drawing Sheets

U.S. PATENT DOCUMENTS

| | | |
|---|---|---|
| 2002/0196414 A1 | 12/2002 | Manni et al. |
| 2007/0251916 A1* | 11/2007 | Akahane et al. ............... 216/27 |
| 2012/0086917 A1* | 4/2012 | Okuda et al. ................. 353/38 |

FOREIGN PATENT DOCUMENTS

| | | |
|---|---|---|
| EP | 1 655 636 A1 | 5/2006 |
| JP | 2002323675 | 11/2002 |
| JP | 2002344050 | 11/2002 |
| JP | 4 235769 B | 3/2009 |
| WO | 0231575 | 4/2002 |
| WO | WO 2009/118902 A1 | 10/2009 |

OTHER PUBLICATIONS

"Speckle Phenomena in Optics: Theory and Applications", by Joseph W. Goodman (Roberts & Company Publishers, Greenwood Village, CO, 2007.

* cited by examiner

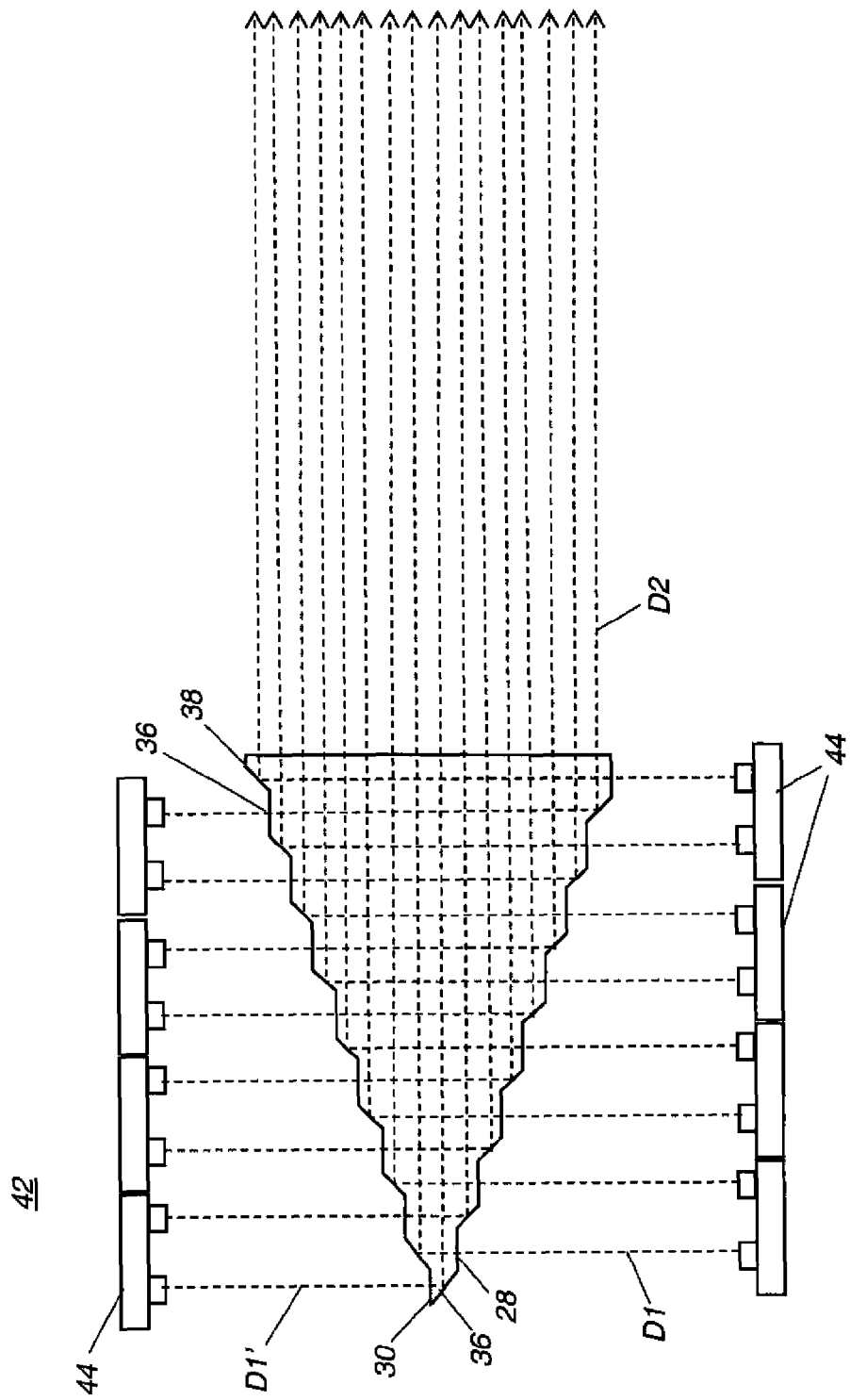

OPTICAL INTERFERENCE REDUCING ELEMENT FOR LASER PROJECTION

CROSS REFERENCE TO RELATED APPLICATIONS

The present invention is related to the commonly assigned U.S. patent application Ser. No. 12/121,185 filed May 15, 2008 entitled UNIFORM SPECKLE REDUCED LASER PROJECTION USING SPATIAL AND TEMPORAL MIXING by Silverstein which is incorporated herein by reference.

FIELD OF THE INVENTION

This invention generally relates to an apparatus for projecting a digital image and more particularly relates to an improved apparatus and method using polarized lasers to create uniform and essentially interference artifact free images for digital cinema projection.

BACKGROUND OF THE INVENTION

There is growing interest in high-quality digital projection systems that display images that can match or surpass the quality of film, especially in large venues. The most promising of these digital projection solutions for multicolor digital cinema projection employ, as image forming devices, one of two basic types of spatial light modulators (SLMs). The first type of spatial light modulator is the Digital Light Processor (DLP) a digital micromirror device (DMD), developed by Texas Instruments, Inc., Dallas, Tex. DLPs have been successfully employed in digital projection systems. DLP devices are described in a number of patents, for example see U.S. Pat. No. 4,441,791; U.S. Pat. No. 5,535,047 and U.S. Pat. No. 5,600,383 (all to Hornbeck).

FIG. 1 shows a simplified block diagram of a projector apparatus 10 that uses DLP spatial light modulators. A light source 12 provides polychromatic unpolarized light into a prism assembly 14, such as a Philips prism, for example. Prism assembly 14 splits the polychromatic light into red, green, and blue component wavelength bands and directs each band onto corresponding spatial light modulators 20$r$, 20$g$ and 20$b$. Prism assembly 14 then recombines the modulated light from the spatial light modulators 20$r$, 20$g$ and 20$b$ and provides this unpolarized light to a projection lens 29 for projection onto a display screen or other suitable surface.

DLP-based projectors demonstrate the capability to provide the necessary light throughput, contrast ratio, and color gamut for most projection applications from desktop to large cinema. However, there are inherent resolution limitations, with existing devices typically providing no more than 2148× 1080 pixels. In addition, high component and system costs have limited the suitability of DLP designs for higher-quality digital cinema projection. Moreover, the cost, size, weight and complexity of the Philips prism or other suitable combining prisms are significant constraints. In addition, the need for a relatively fast projection lens with a long working distance, due to brightness requirements, negatively impacts the acceptability and usability of these devices.

The second type of spatial light modulator used for digital projection is the Liquid Crystal Device (LCD). LCD spatial light modulators form an image as an array of pixels by selectively modulating the polarization state of incident light for each corresponding pixel. LCDs have some advantages as spatial light modulators for high-quality digital cinema projection systems. These advantages include relatively large device size, favorable device yields and the ability to fabricate higher resolution devices, for example the 4096×2160 resolution devices available from Sony and JVC Corporations. Among examples of electronic projection apparatus that utilize LCD spatial light modulators are those disclosed in U.S. Pat. No. 5,808,795 by Shimomura et al. Liquid Crystal On Silicon (LCOS) devices are thought to be particularly promising for large-scale image projection. However, with LCD components it can be difficult to maintain the high quality demands of digital cinema, particularly with regard to color and contrast, since the high thermal load of high brightness projection affects the polarization qualities of these devices.

A continuing problem with illumination efficiency relates to etendue or, similarly, to the Lagrange invariant. As is well known in the optical arts, etendue relates to the amount of light that can be handled by an optical system. Potentially, the larger the etendue, the brighter the image can be. Numerically, etendue is proportional to the product of two factors, namely the image area and the numerical aperture. In terms of the simplified optical system represented in FIG. 2 having light source 12, optics 18, and a spatial light modulator 20, etendue is a product of light source area A1 and its output angle $\theta 1$, and, in a well-matched optical system, this is equal to the product of the modulator area A2 and its acceptance angle $\theta 2$. For increased brightness, it is desirable to provide as much light as possible from the area of light source 12. As a general principle, the optical design is advantaged when the etendue at the light source is most closely matched to the etendue at the spatial light modulator.

Increasing the numerical aperture, for example, increases etendue so that the optical system captures more light. Similarly, increasing the source image size, so that light originates over a larger area, increases etendue. In order to utilize an increased etendue on the illumination side, the etendue at the spatial light modulator must be greater than or equal to that of the illumination source. Larger image sizes, however, typically result in a more costly system. This is especially true of LCOS and DLP components, where the silicon substrate and defect potential increase with size. As a general rule, increased etendue results in a more complex and costly optical design. Using a conventional approach such as that outlined in U.S. Pat. No. 5,907,437 by Sprotbery et al., for example, lens components in the optical system must be designed for large etendue. The source image area for the light that must be converged through system optics is the sum of the combined areas of the spatial light modulators in red, green, and blue light paths; notably, this is three times the area of the final multicolor image formed. That is, for the configuration disclosed in such a conventional approach, optical components handle a sizable image area, therefore a high etendue, since red, green, and blue color paths are separate and must be optically converged. Moreover, although a configuration such as that disclosed in the Sprotbery et al. patent handles light from three times the area of the final multicolor image formed, this configuration does not afford any benefit of increased brightness, since each color path contains only one-third of the total light level.

Efficiency improves when the etendue of the light source is well-matched to the etendue of the spatial light modulator. Poorly matched etendue means that the optical system is either light-starved, unable to provide sufficient light to the spatial light modulators, or inefficient, effectively discarding a substantial portion of the light that is generated for modulation.

The goal of providing sufficient brightness for digital cinema applications at an acceptable system cost has eluded designers of both LCD and DLP systems. LCD-based systems have been compromised by the requirement for polarized light, reducing efficiency and increasing etendue, even where polarization recovery techniques are used. DLP device designs, not requiring polarized light, have proven to be somewhat more efficient, but still require expensive, short lived lamps and costly optical engines, making them too expensive to compete against conventional cinema projection equipment.

In order to compete with conventional high-end film-based projection systems and provide what has been termed electronic or digital cinema, digital projectors must be capable of achieving comparable cinema brightness levels to this earlier equipment. As some idea of scale, the typical theatre requires on the order of 10,000 lumens projected onto screen sizes on the order of 40 feet in diagonal. The range of screens requires anywhere from 5,000 lumens to upwards of 40,000 lumens. In addition to this demanding brightness requirement, these projectors must also deliver high resolution (2048×1080 pixels) and provide around 2000:1 contrast and a wide color gamut.

Some digital cinema projector designs have proved to be capable of this level of performance. However, high equipment cost and operational costs have been obstacles. Projection apparatus that meet these requirements typically cost in excess of $50,000 each and utilize high wattage Xenon arc lamps that need replacement at intervals between 500-2000 hours, with typical replacement cost often exceeding $1000. The large etendue of the Xenon lamp has considerable impact on cost and complexity, since it necessitates relatively fast optics to collect and project light from these sources.

One drawback common to both DLP and LCOS LCD spatial light modulators has been their limited ability to use laser light sources. Although they are advantaged over other types of light sources with regard to relative spectral purity and potentially high brightness levels, laser light sources require different approaches in order to use these advantages effectively. Conventional methods and devices for conditioning, redirecting, and combining light from color sources, used with earlier digital projector designs, can constrain how well laser light sources are used.

Solid-state lasers promise improvements in etendue, longevity, and overall spectral and brightness stability, but, until recently, have not been able to deliver visible light at sufficient levels and at costs acceptable for digital cinema. In a more recent development, laser arrays have been commercialized and show some promise as potential light sources. However, brightness itself is not yet high enough; the combined light from as many as 9 individual arrays is needed in order to provide the necessary brightness for each color.

Laser arrays of particular interest for projection applications include various types of VCSEL (Vertical Cavity Surface-Emitting Laser) arrays, including VECSEL (Vertical Extended Cavity Surface-Emitting Laser) and NECSEL (Novalux Extended Cavity Surface-Emitting Laser) devices from Novalux, Sunnyvale, Calif. However, conventional solutions using these devices have been prone to a number of problems. One limitation relates to device yields. Due largely to heat and packaging problems for critical components, the commercialized VECSEL array is extended in length, but limited in height; typically, a VECSEL array has only two rows of emitting components. The use of more than two rows tends to increase yield difficulties dramatically. In addition, conventional VECSEL designs are prone to difficulties with power connection and heat sinking. These lasers are of high power; for example, a single row laser device, frequency doubled into a two-row device by Novalux, produces over 3 W of usable light. Thus, there can be significant current requirements and heat load from the unused current. Lifetime and beam quality is highly dependent upon stable temperature maintenance.

Coupling of the laser sources to the projection system presents another difficulty that is not adequately addressed using conventional approaches. For example, using Novalux NESEL lasers, approximately nine 2 row by 24 laser arrays are required for each color in order to approximate the 10,000 lumen requirement of most theatres. It is desirable to separate these sources, as well as the electronic delivery and connection and the associated heat from the main thermally sensitive optical system to allow optimal performance of the projection engine. Other laser sources are possible, such as conventional edge emitting laser diodes. However, these are more difficult to package in array form and traditionally have a shorter lifetime at higher brightness levels.

The use of laser sources in general presents its own set of imaging artifacts. The primary artifacts of concern are that of laser speckle and illumination uniformity. Speckle is a fine scale spatially varying intensity fluctuation that is caused by random roughness of optical surfaces on the order of a wavelength of light. The increased coherence of lasers introduces a significant effect in projection systems where the roughness creates randomly phased sub-sources interfering together. This random intensity fluctuation lowers the effective MTF of an image, especially at the higher frequencies essentially producing a "shimmer effect" in detail, but also creating an intensity sharpness that is really artificial. The phenomenon of speckle has been studied in detail by many researchers and a comprehensive summary of knowledge has been published by Joseph Goodman, *Speckle Phenomena in Optics: Theory and Application*, (Roberts & Company Publishers, Greenwood Village, Colo., 2007). Goodman indicates that full-frame displays should at least have the standard deviation intensity variation less than that of the least significant bit of the intensity resolution of the modulation device. For Digital Cinema applications this control at 12 bits and contrast ratios of around 2000:1 are common. Other cinema standards lean toward different criteria, indicating that speckle "should not be visible", this can be quantitatively assumed to have the level of speckle to be equivalent to that of a white light projector on a common screen. This has been measured to be around 3% peak to valley variation in intensity.

Goodman has characterized some common approaches to reducing speckle in display applications:
1. Introduce polarization diversity;
2. Introduce a moving screen;
3. Introduce a specially designed screen that minimizes the generation of speckle;
4. For each color, broaden the spectrum of the sources or use multiple lasers at slightly different frequencies, thereby achieving wavelength diversity in the illumination;
5. For each color, use multiple independent lasers separated spatially, thereby achieving angle diversity in the illumination;
6. Overdesign the projection optics as compared with the resolution of the eye;
7. Image a changing diffuser with random phase cells onto the screen; and
8. Image a changing diffuser with deterministic or orthogonal phase codes onto the screen.

Each of these approaches has some benefits as well as negative attributes. Some of these apply well for high-end digital cinema projection, while others do not. In addition, in many cases a single approach may not be effective enough to reduce the speckle below acceptable thresholds.

Polarization diversity is not desirable in many cases, as any projector that requires polarization either to modulate the light or to create stereoscopic imaging cannot allow impure states to reach the viewer. Specially designed screens and screen shaking can be effective; however, this requires modification to the venue, which is undesirable because being able to show a quality on any screen is preferred. Similarly, if a polarization maintaining screen is desired adding additional constraints or features may be prohibitively expensive or difficult. Manufacturing processes used to make large screens are especially difficult to modify because the equipment is large and expensive.

Spectrally broadening may be desirable, however, this may be difficult to control in the laser fabrication, as many methods of creating visible solid state sources desired for display applications use frequency double crystals that control the wavelength to around 1 nm.

Multiple independent lasers are a very good approach, but this solution depends on the number of elements used to control the speckle. This does not work well over the range of light levels encountered from low-light-level to high-light-level projection systems, because a 1000 lumen projector needs to be as speckle free as a 10,000 lumen projector, even though the number of sources may be a factor of 10 times less for the 1000 lumen projector. For example, Mooradian et al, disclose an improved speckle performance in their paper "High Power Extended Vertical Cavity Surface Emitting Diode Lasers and Arrays and Their Applications" published in the proceedings of the Micro-Optics Conference, held in Tokyo, Japan on Nov. 2, 2005. In this case 30 to 40 independent (incoherent to each other) emitters reduced the speckle down to several percent. While the speckle is reduced with larger number of emitters it is not always reduced to white light levels necessitated by the stringent digital cinema requirements.

Changing diffusers can be very effective in some configurations. However, this increases the etendue of the sources by creating additional angular extent and requires a relatively expensive and controlled surface treatment on a glass surface in order to be durable for high-powered systems.

In U.S. Pat. No. 7,296,987 Mooradian et al. disclose individual and combined techniques to reduce laser speckle similar to those described by Goodman. First, they describe increasing the number of lasers that are substantially incoherent with respect to each other. Second, they also teach that spectral broadening of the lasers may be used. (This technique is also described in U.S. Pat. No. 6,975,294 by Manni et al.) Third, they disclose that individual lasers in an array may be designed to operate with multiple frequency, phase, and directional (angular) distributions. Finally, they describe using an optical element to scramble the direction, phase and polarization information. As described earlier, increasing the number of lasers is effective at reducing speckle, however is incomplete. The additional methods described are difficult to implement, expensive or undesirable optically.

U.S. Pat. No. 7,244,028 by Govorkov et al. describes the use of at least one laser delivered to a scanning means that increases the laser beam divergence temporally into a lens that delivers the light to a beam homogenizer that illuminates a spatial light modulator, this reduces the laser speckle to acceptable levels when combined with a screen that has at least one feature to further reduce speckle. Temporally varying the laser beam divergence is generally a good means of reducing speckle, however it too requires the modification of the screen for complete speckle reduction. This is undesirable for general projection purposes.

U.S. Pat. No. 7,116,017 by Ji et al. describes a specific device consisting of a vibrating mirror in the light path between the laser and the screen. This alone will not reduce speckle to acceptable levels. U.S. Pat. No. 6,445,487 by Roddy et al. describes methods that use frequency modulation of the lasers in conjunction with a device to deviate the beam angularly in time. This method requires laser modulation that may not be practical or possible for all laser sources. Similarly the application focuses on using an acousto-optic modulator for angular deviation. These devices are very expensive and can only handle certain laser types and sizes.

While laser speckle has been the artifact given the most attention in laser projection systems, other artifacts resulting from the coherent nature of lasers can become problems. Speckle is an artifact caused by the small features on the order of a wavelength on the optical surfaces in the system, each creating a new relative source. Generalized interference can also occur from fill surface wavefront interference or more macro-level structures in the system. One prime example of this is interference created from uniformizing optics. Uniformizing optics are typically comprised of optical elements that, either in combination or independently, overlap sources in an angular or spatial manner. With incoherent light this would provide a mixing of initially non-uniform intensity to create a uniform, averaged intensity output. Devices such as integrating bars and spaced lenslet arrays are examples of techniques that are common in the art. However, utilizing these devices to uniformize one or more coherent light sources creates many opportunities for the overlapping of phased wavefronts, thus resulting in multiple interference artifacts. Therefore, both lenslet arrays and integrating bars are plagued with interference fringes associated with the pattern of the overlapping angular and spatial wavefronts. This structure is unacceptable for imaging a uniform data set from the spatial light modulator.

Thus, it can be seen that the challenge of providing a color laser projection system having cinema quality in uniformity and brightness has not been met.

There is a need for a coherent illumination solution that enables uniform interference free imaging for high-end projection systems.

SUMMARY OF THE INVENTION

It is an object of the present invention to address the need for providing a color laser projection system with imaging performance that has high brightness and uniformity. With this object in mind, the present invention provides a laser projection system comprising:

a laser source system configured to emit coherent light;

an optical integrating system configured to uniformize coherent light it receives;

a randomizing optical element configured to spatially move over time in order to temporally randomize the phase, angle or spatial location of coherent light it receives;

an image forming system configured to interact with laser light that has been both uniformized by the optical integrating system and phase, angle or spatial location randomized by the optical element, thereby forming a laser light image; and a projection system configured to project the laser light image onto a viewing screen.

The present invention has the advantage that projected images having reduced interference artifacts are formed.

The present invention has the additional advantage that single or multiple laser sources may be utilized and uniformized for quality image projection using optical integrating systems such as integrating bars or lenslet arrays without forming visible interference artifacts. Further, in the case where multiple lasers are utilized, individual laser intensity may change in situ without substantially impacting the image quality.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 5B is a schematic diagram showing an alternate embodiment of an illumination combiner;

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figures shown and described herein are provided to illustrate principles of operation according to the present invention and are not drawn with intent to show actual size or scale. Because of the relative dimensions of the component parts for the laser array of the present invention, some exaggeration is necessary in order to emphasize basic structure, shape, and principles of operation.

Embodiments of the present invention address the need for laser projection displays with minimal artifacts due to source coherence.

Figure 1:
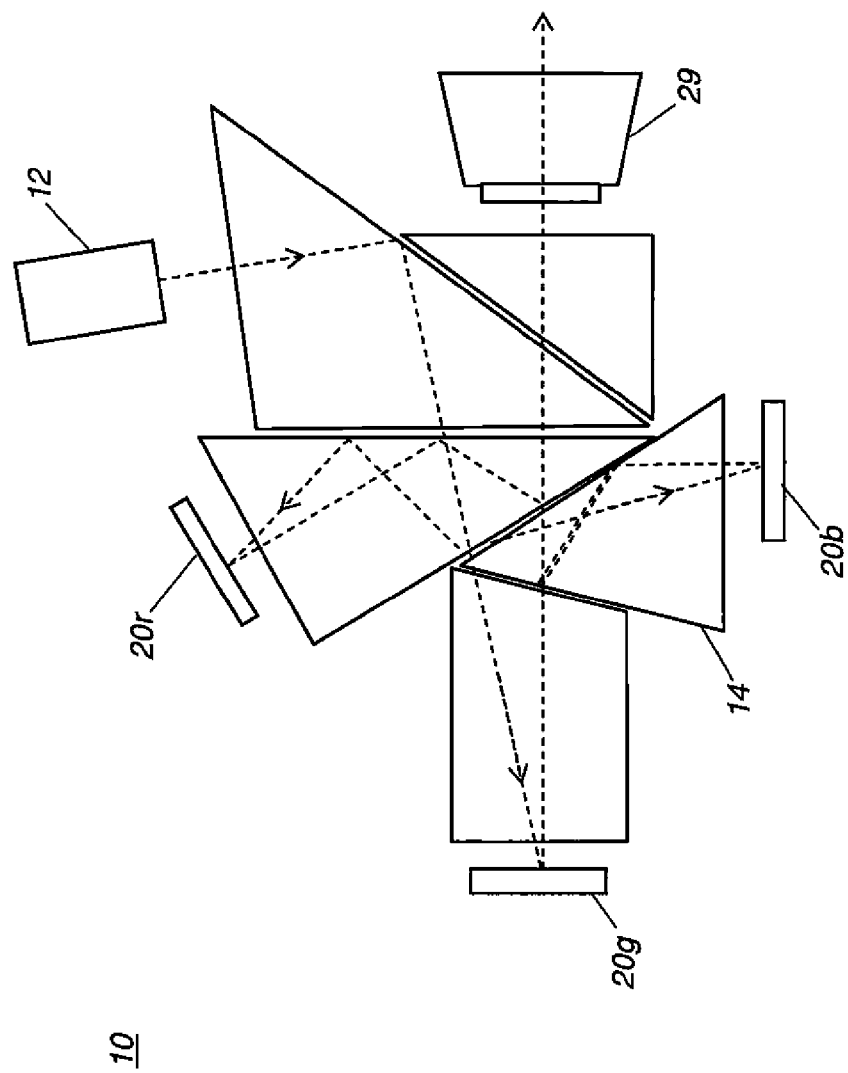
FIG. 1 is a schematic diagram of a conventional projection apparatus using a combining prism for the different color light paths.
Figure 2:
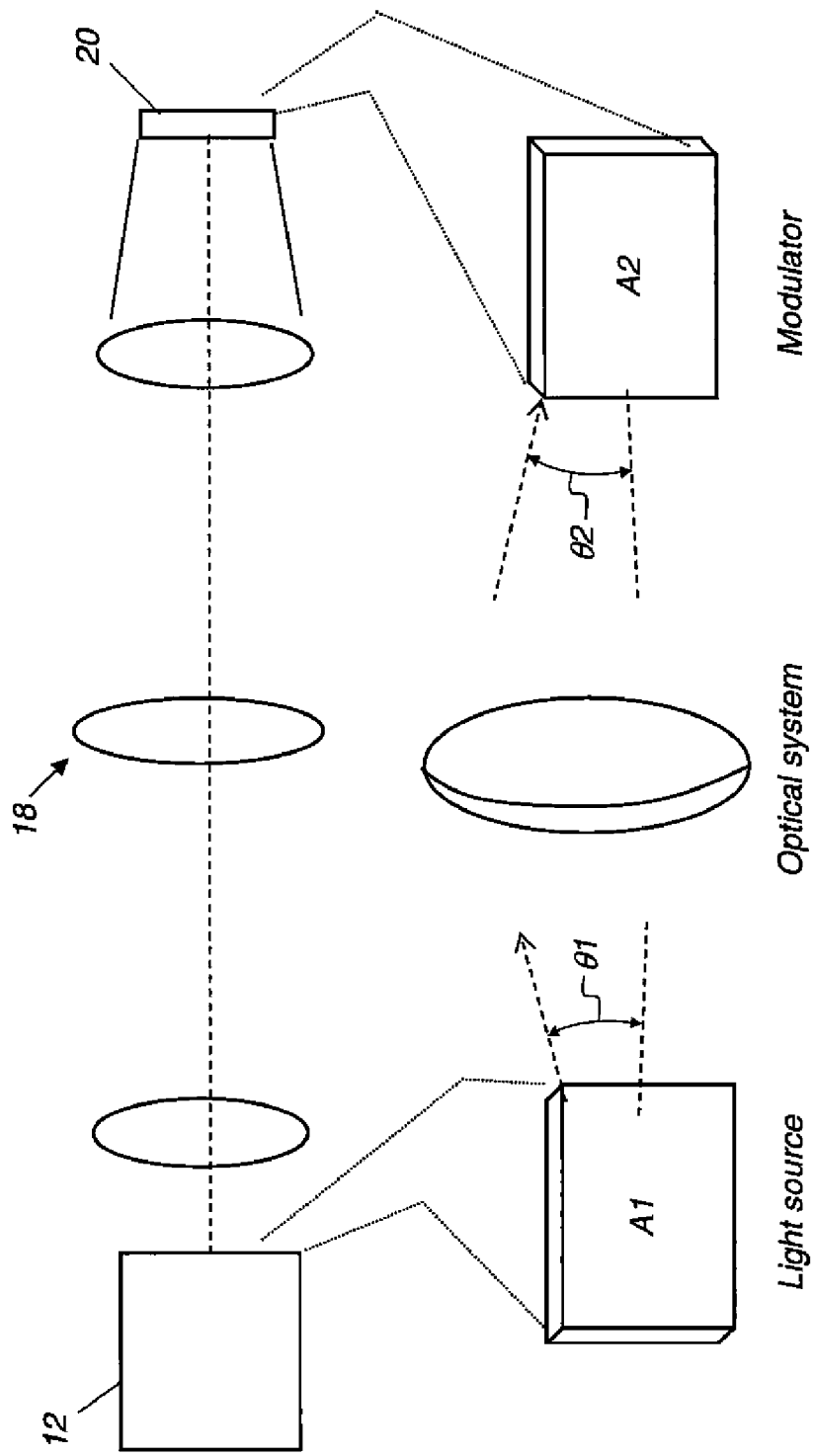
FIG. 2 is a schematic diagram depicting the etendue relationship of a projection system.

In projection display applications it is desirable to utilize lasers because of their purity of spectrum, providing increased color gamut, inherent polarization and most importantly the reduced etendue (angular and spatial extent of the sources). As discussed earlier, FIG. 2 describes etendue matching in an optical system. Light source 12 has a defined angular and spatial extent (etendue). In order to utilize this light efficiently optics 18 must deliver the light to the light modulator 20 such that the etendue at the light modulator 20 matches the etendue at the light source 12. If the etendue is not matched, either light will be lost or the complexity of the optics will be unnecessarily increased. The reduced etendue of lasers enables optical components, optical modulators, and optical coatings to function over a smaller angular range. This generally enhances the optical efficiency and contrast ratio of the display. Additionally, these reduced requirements simplify the optical elements, thereby substantially reducing the cost and complexity of the system.

Laser coherence, the property of light waves having a particular phase signature, tends to be detrimental to creation of quality images. Interference between beams of relative phase causes unwanted intensity structure. Single coherent lasers impinging upon optical defect structures in an optical system lead to random interference patterns known as speckle. Therefore, it is well-understood that using multiple laser sources of independent phase parameters is advantaged in that the combination of these sources reduces the inherent phase coherency of the combined beam. This essentially creates a measure of incoherence, thereby reducing the speckle. Increasing the number of lasers decreases the phase structure and further reduces the speckle creation. While the use of multiple lasers tends to reduce the general coherence of the lasers to substantially reduce speckle, there can be residual coherence, especially in the case of small screens where fewer lasers are used.

While speckle artifacts affect the quality of a laser projection image as a result of the interaction of coherent light with optical defects, other artifacts may occur as well. Optical interference from coherent light will occur from any overlapping of phase fronts in the optical system. Ghost reflections from poorly coated optics are one possible cause of these interference fringes.

One of the most likely sources of this phase front interference is caused by the desire to have uniform illumination delivered to the spatial light modulator. In a conventional lamp based projector an optical integration device is utilized to mix the light from the illumination source. Typically these optical integration devices utilize either an integrating bar or a set of paired lenslet arrays. The optical integration devices are designed to mix the light either spatially or angularly or a combination of the two means. Typically, the illumination beam is broken up into beamlets based on angle and/or position and recombined by overlapping the various beamlets. A greater number of beamlets offers a greater degree of uniformity for the resulting mixed output beam. This is a highly effective method for uniformizing incoherent light. However, utilizing this method with coherent light provides the ideal conditions to create overlapping phase fronts and the resulting optical interference fringes associated with such overlaps. Thus, non-uniform interference artifacts typically result from the uniformized illumination delivered to the spatial light modulator.

Figure 3:
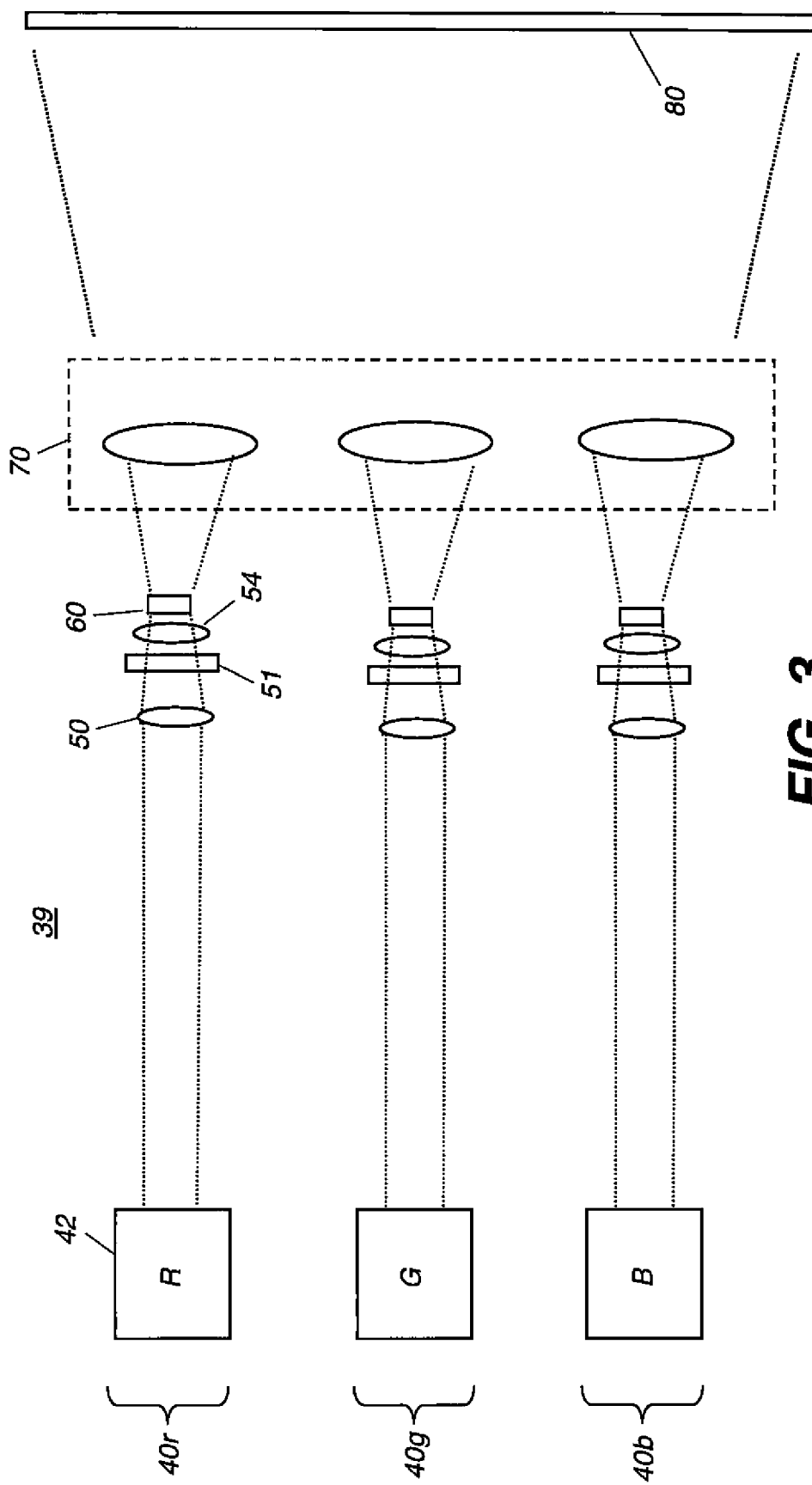
FIG. 3 is a schematic diagram showing the general arrangement of a projection apparatus using an illumination combiner for image projection.

In order to better understand the present invention, it is instructive to describe the overall context within which apparatus and methods of the present invention can be operable. The schematic diagram of FIG. 3 shows a basic arrangement for a projection apparatus 39 that can utilize the present invention. Three light modulation assemblies 40r, 40g, and 40b are shown, each modulating light for one of the primary red, green or blue (RGB) colors. For each color channel, an illumination combiner 42 combines light from a plurality of light sources. An optional lens 50 then directs light through an integrator 51, such as a fly's eye integrator or integrating bar, for example. This light is relayed by lens 54 to a light modulator 60. Light modulator 60 is a micro-electromechanical systems (MEMS) device, an LCD (Liquid Crystal Device) or any other type of optical modulation component. For simplification purposes the primary embodiment will concentrate on a MEMS spatial light modulator, where the devices can be considered as "polarization state neutral". This means that the device does not modulate light at each pixel by modulating the polarization state of the pixel; any change to the polarization state of the incident light for any pixel is inadvertent, and will be a function of its incident angle when reflected from the MEMS surfaces for that pixel.

Figure 4:
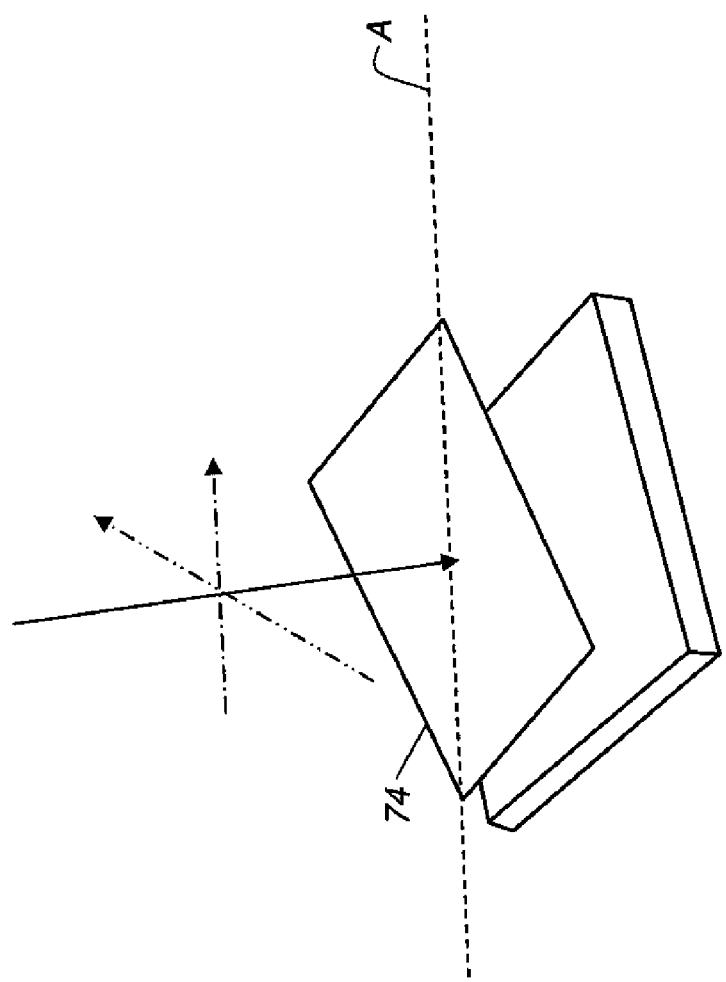
FIG. 4 is a perspective showing a single pixel modulator and its axis of rotation.

The incident angle of light to the MEMS spatial light modulator can be adjusted to minimize any unwanted polarization effects as shown in FIG. 4 by orienting the input and output polarization state either in plane or orthogonal to the plane of the micromirror 74. Axis A indicates the hinge pivot line for a DLP micromirror. For this embodiment the modulator must take light of two orthogonal input polarization states and output light of two orthogonal polarization states that correspond to the respective input states. The output polarization states may, however, be rotated with respect to the input states.

Projection optics 70, indicated generally in a dashed outline in FIG. 3 due to its many possible embodiments, then direct the modulated light to a display surface 80. The overall arrangement shown in FIG. 3 is used for subsequent embodiments of the present invention, with various arrangements used for illumination combiner 42.

Figure 5A:
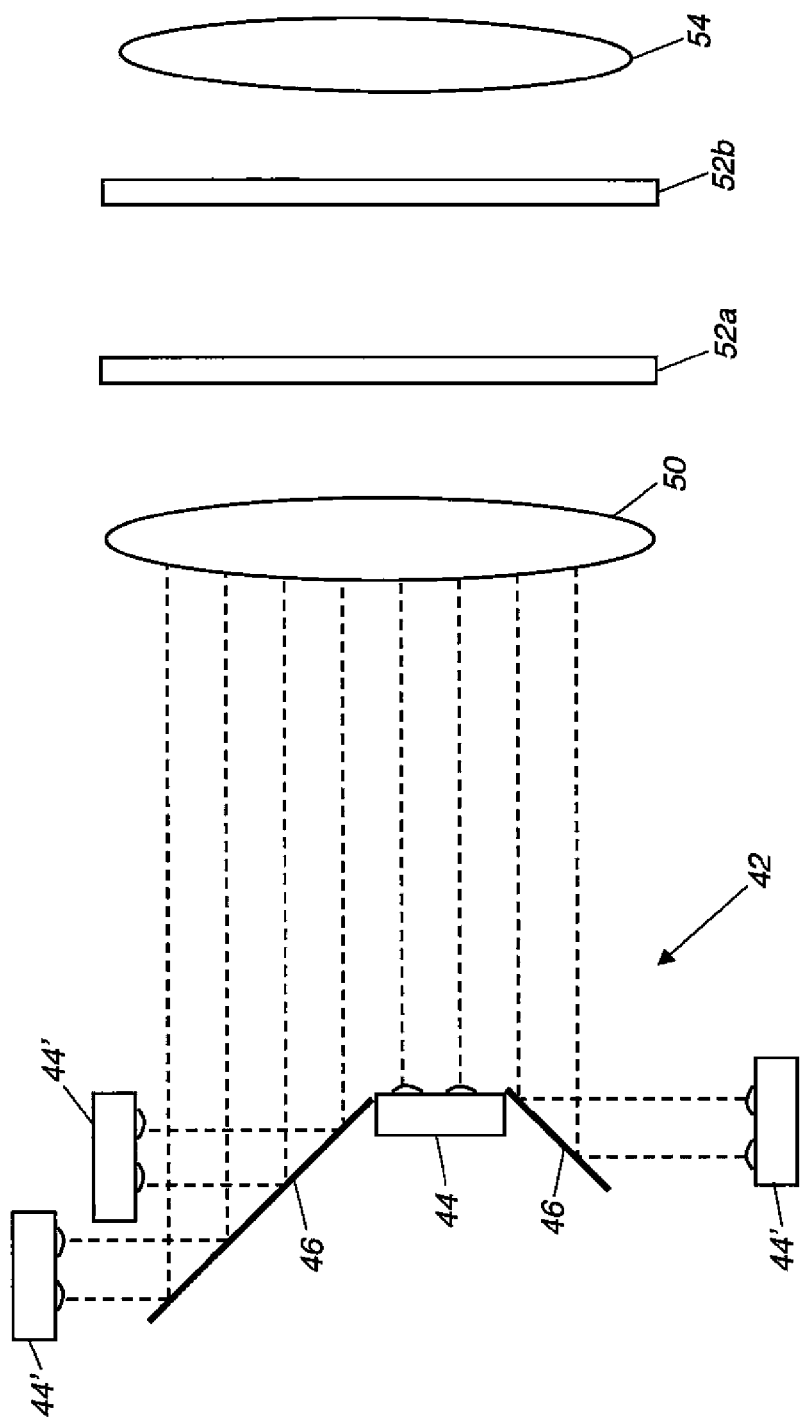
FIG. 5A is a schematic diagram showing a beam combining system.

FIG. 5A shows one embodiment of an illumination combiner 42 for combining laser light array 44 and additional laser light arrays 44' to form a larger array. In this configuration, one or more interspersed mirrors 46 may be used to place the optical axis of the additional laser light arrays 44' in line with the optical axis of the laser light array 44. However, it can be appreciated that heat and spacing requirements may limit how many laser light arrays can be stacked in this manner. Optically it is desirable to have the lasers combined into the smallest spatial and angular combination so as to reduce the etendue and simplify the optical system.

In many laser projection display designs, the combined laser arrays would be focused either into an optical integrating bar or waveguide. The near-field or Fresnel condition combined light would be focused down to a smaller source by lens 50, thus be further mixed both spatially and angularly by this method. The combined light source would be kept relatively small in this manner as the divergence of the lasers is typically small, thus reducing the size of the focusing optic and the integration optic to simplify packaging and reducing the cost. This approach is desirable to reduce laser speckle under most circumstances as the integrating bar or optical waveguide (for example an optical fiber) reduces coherence by mixing the polarization, phase, angles and spatial content of the independent sources In addition to, or in place of, the integrating bar or optical waveguide, lenslet arrays or "fly's eyes" often are utilized as a polarization maintaining optical integrator. Unlike integrating bars or rods, no polarization scrambling reflections are utilized in lenslet integrator configurations, such as that shown in FIG. 5A. Lenslet integrators are typically made up of two lenslet arrays. First lenslet array 52a is typically made up of multiple lens elements in the aspect ratio of the illuminated device (optical modulator). In one embodiment, the first lenslet array 52a images the laser sources and is illuminated with the far-field illumination of the laser sources. Optional lens 50 may be used to angularly manage the light into the first lenslet array. Typically, the first lenslet array is illuminated with nearly collimated light. The first lenslet array 52a images the light onto the second lenslet array 52b. In this manner the second lenslet array 52b acts as a field lens in conjunction with lens 54 and images each of the lenslets in the first array onto the optical modulator in an overlapping fashion. The more lenslets that are used in the array, the more mixing will occur and the better the uniformity of the output illumination will be, although more lenses translate to optical losses due to the imperfect nature of the lenslet arrays. Since the polarization has less opportunity to be scrambled when utilizing a lenslet integrator as a uniformizer, this provides further impetus for interference artifacts in the coherent illumination path.

FIG. 5B shows another embodiment of an illumination combiner 42 that provides an even more compact arrangement of illumination using laser arrays than the embodiment shown in FIG. 5A. In this embodiment, light redirecting prism 30 has two redirection surfaces 36, accepting light from laser light arrays 44 that are facing each other, with opposing emission directions D1 and D1'. Each redirection surface 36 has two types of facets: a light-redirecting facet 38 and an incidence facet 28 that is normal to the incident light from the corresponding laser light array 44. This allows for easier alignment of the various laser modules to the light-redirecting prism 30 by retro-reflection of a small residual light from an anti-reflection coated face on facet 28 back into each of the lasers. The light-redirecting facets 38 are arranged so as to redirect the light from the laser light arrays 44 into parallel beams in output direction D2.

The coherent interference artifacts in the illumination of the spatial light modulator may be reduced or effectively eliminated by temporally shifting the phase of the optical wavefront. As the phase of the wavefront is varied, the phase of the resulting interference artifacts varies accordingly. If the wavefront is varied fast enough, human observers will temporally average the resulting patterns, thus masking the visibility of the interference artifacts.

Figure 6:
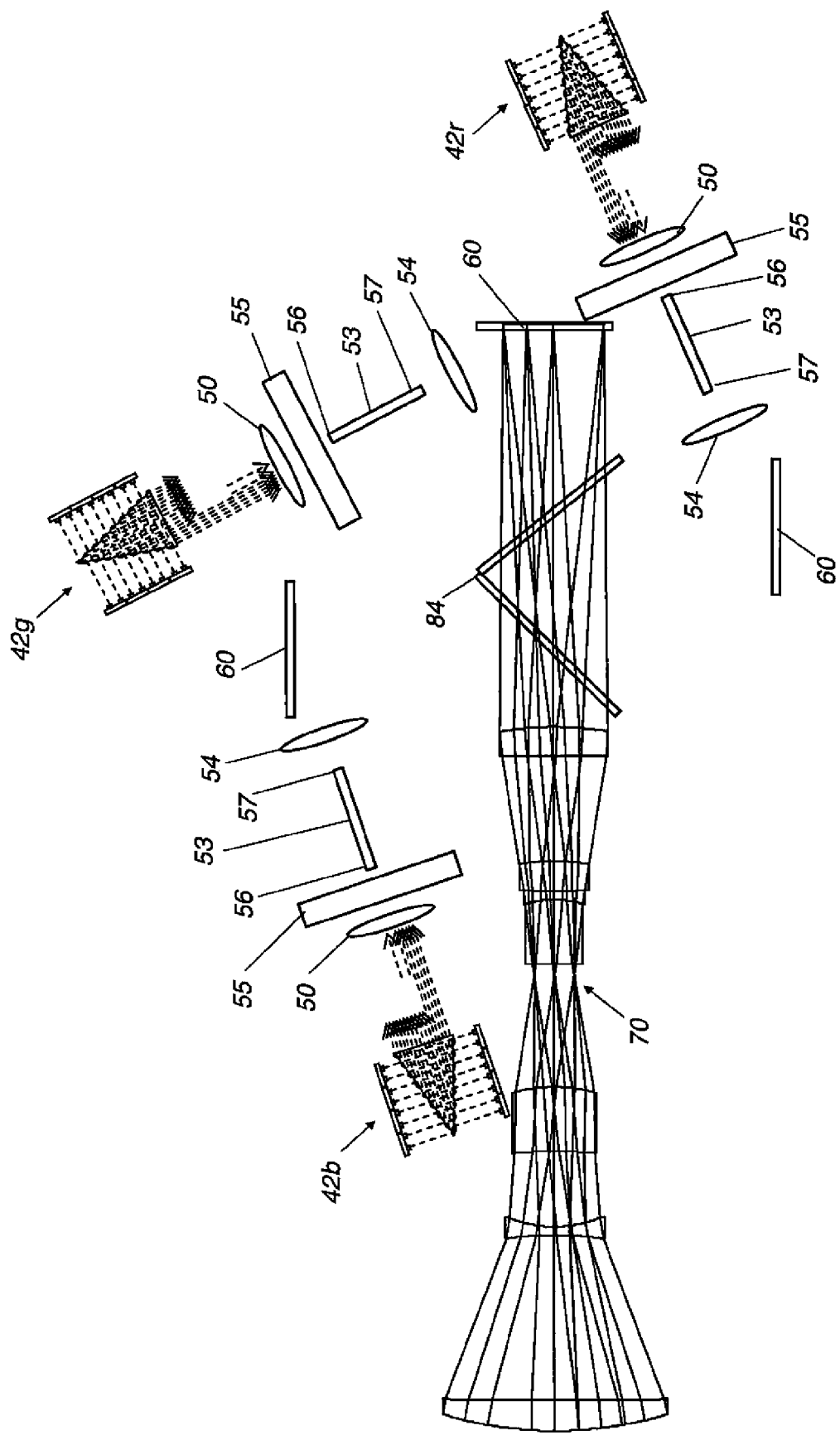
FIG. 6 is a schematic diagram of a three color projection system with temporal shifting devices placed prior to the input plane of the integrating devices.

Devices for temporally shifting the phase, angle or spatial location of the coherent light beam may be placed in the optical path either before or after the optical integrator, but must be placed prior to the spatial light modulator. FIG. 6 shows one embodiment of the present invention using three illumination combiners, 42r, 42g and 42b, for the red, green and blue color channels of a laser projection system. Each illumination combiner 42r, 42g and 42b has an associated optical path including lens 50, integrating device 53, lens 54, temporal shifting device 55 and light modulator 60. Dichroic surfaces 84 are used to combine light beams from the three illumination combiners 42r, 42g and 42b and direct the combined light beams through projection optics 70. Integrating device 53 has an input plane 56, which is the plane where light enters the integrating device 53, and an output plane 57, which is the plane where the light exits the integrating device 53.

In the FIG. 6 configuration, temporal shifting device 55 is located prior to the input plane 56 of integrating device 53. In this embodiment temporal shifting device 55 is shown adjacent to input plane 56. In the context of this disclosure the term adjacent is taken to mean that there are no intervening optical elements. In some cases, it will be desirable to place the temporal shifting device 55 at or substantially at the input plane 56. By placing temporal shifting device 55 prior to integrating device 53, the impact of the temporal shifting device 55 on illumination uniformity are averaged over the entire spatial area, and therefore there is a lower risk of causing additional artifacts.

Figure 7:
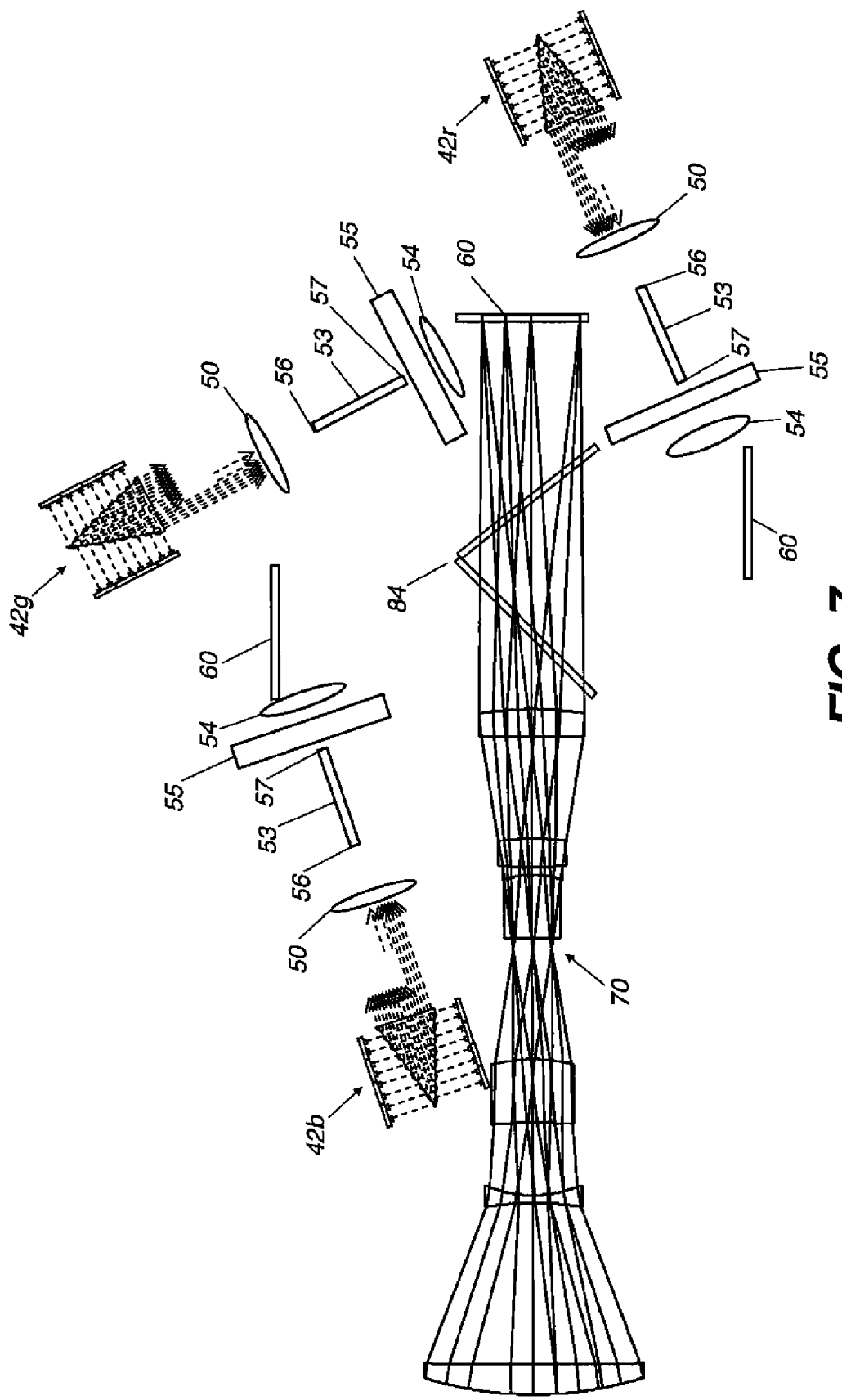
FIG. 7 is a schematic diagram of a three color projector system with temporal shifting devices placed after the output plane of the integrating devices.

FIG. 7 shows an alternate embodiment of the present invention which is analogous to the FIG. 6 configuration except that with temporal shifting device 55 adjacent to the exit plane 57 of integrating device 53 rather than the input plane 56. In some cases, it will be desirable to place the temporal shifting device 55 at or substantially at the input plane 57. Types of temporal shifting devices 55 that may be considered for this stage could be a vibrating optical element such as a mirror or plate. Random liquid crystal phase pattern generators or acousto-optic modulators may also be used.

Figure 8:
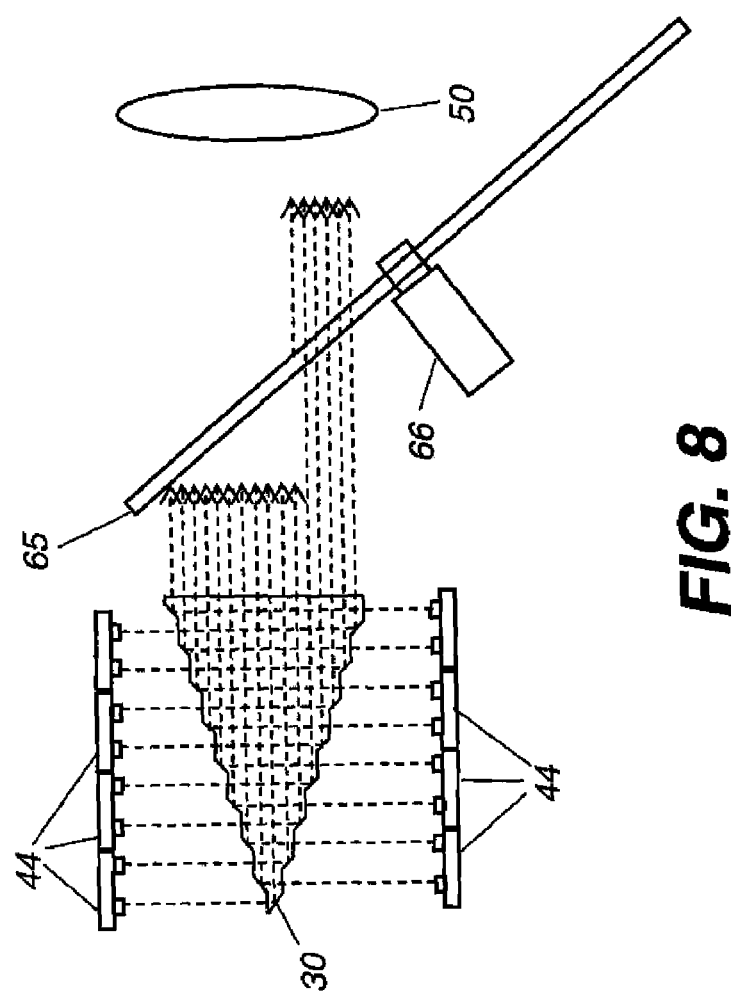
FIG. 8 is a schematic diagram illustrating the use of a rotating optical element as the temporal shifting device.

FIG. 8 shows a configuration according to a preferred embodiment of the present invention where a rotating optical element is used as the temporal shifting device. Laser light arrays 44 are combined using light redirecting prism 30 to generate a light beam which is directed through rotating disk 65 onto lens 50. The rotating disk 65 is driven by a motor 66. The rotating disk 65 may be a refractive optical element that is wedged, diffused, or aberrated to provide the temporal shifting characteristics. In each case, a time-varying optical path difference is created in the illumination path, which changes the residual interference without an associated depolarization. This occurs over a period in which the spatial light modulator is able to average out over each frame's exposure period. This averaging should be faster than 60 hertz to prevent this artifact from being visible. Preferably, one or more surfaces of the rotating disk 65 are anti-Newton glass surfaces, which have been roughened very slightly, in order to disrupt the phase of the incident light.

The temporal shifting device must impact the optical artifact enough to average out the intensity levels to the baseline illumination. In order to do this by utilizing optical phase shifting, it is important to create enough phase change to fully shift an intensity peak in the interference pattern to an intensity trough. This requires at minimum a 180° phase shift. Therefore, if a phase coating is used, 180° phase steps or greater are needed and the motion must move the phase steps, such that at least one 180° phase step moves over each region of artifact during the temporal period. Additional movement or phase steps over the temporal period will further enhance illumination averaging. The phase steps may be created by surface treatment such as holographic layers, polishing, etching, molding or other structural means. It is preferred that the angular extent of the resulting surface is minimally changed with respect to the angular input, thereby resulting in minimal light loss. Alternately, both sides may be polished, but not optically flat such that multiple waves of optical path difference are induced into the light beams varying at the rotational frequency. This is preferred over an essentially non-polished surface in that it does not substantially increase the angular content of the illumination light and therefore increase the etendue and associated light losses. In yet another embodiment of the present invention, the randomizing optical element is a diffractive optical element that diffracts the incident light.

The embodiment shown in FIG. 8 uses a rotating optical element as the temporal shifting device. In alternate embodiments of the present invention, the randomizing optical element may be spatially moved by translation. For example, a piezoelectric device can be used to randomly or periodically deflect the position of the randomizing optical element. Similarly, a motor with an off-axis cam can be used to shift the position of the randomizing optical element.

The invention has been described in detail with particular reference to certain preferred embodiments thereof, but it will be understood that variations and modifications can be effected within the spirit and scope of the invention. For example, where laser arrays are described in the detailed embodiments, other laser emissive components could be used as an alternative. Supporting lenses and other optical components may also be added to each optical path. In optical assemblies shown herein, the order of the light integration and relaying can be reversed without significant difference in effect.

Thus, what is provided is an apparatus and method reducing coherent interference illumination artifacts in an electronic projection display?

PARTS LIST

10 Projector apparatus
12 Light source
14 Prism assembly
18 Optics
20, 20r, 20g, 20b light modulator
28 Incidence facet
29 projection lens
30 Light redirecting prism
36 Redirection surface
38 Light-redirecting facet
39 projection apparatus
40r, 40g, 40b Light modulation assembly
42, 42r, 42g, 42b Illumination combiner
44 Laser light array
44' Additional laser light array
46 Mirror
50 Lens
51 Integrator
52a First lenslet array
52b Second lenslet array
53 Integrating device
54 Lens
55 Temporal shifting device
56 Input plane
57 Output plane
60 Light modulator
65 Rotating Disk
66 Motor
70 Projection optics
80 Display surface
84 Dichroic surface
A Axis
A1 Light source area
A2 Modulator area
D1, D1' Emission direction
D2 Output direction
θ1 Output angle
θ2 Acceptance angle

What is claimed is:
1. A digital projection system comprising:
a light source system configured to emit coherent light;
an optical integrating system including an optical integrating element configured to uniformize coherent light it receives, wherein the optical integrating element (53) is an optical integrating bar or waveguide;
a randomizing optical element configured to spatially move over time in order to temporally randomize the phase, angle or spatial location of coherent light it receives, wherein the optical integrating element immediately precedes the randomizing optical element in a path of the laser light with no intervening elements;
an image forming system configured to interact with laser light that has been both uniformized by the optical integrating system and randomized by the randomizing optical element, thereby forming a laser light image; and
a projection system configured to project the laser light image onto a viewing screen.

2. The laser projection system of claim 1, wherein the randomizing optical element is a refractive optical element.

3. The laser projection system of claim 1, wherein the randomizing optical element is a diffractive optical element.

4. The laser projection system of claim 1, wherein the randomizing optical element is spatially moved by rotation.

5. The laser projection system of claim 1, wherein the randomizing optical element is spatially moved by translation.

6. The laser projection system of claim 1, wherein the optical integrating system has an associated input plane preceding the optical integrating system in the path of the emitted laser light and an associated output plane following the optical integrating system in the path of the emitted laser light.

7. The laser projection system of claim 6, wherein the randomizing optical element is located at or substantially at the output plane.

8. The laser projection system of claim 1, wherein the randomizing optical element comprises one or more anti-Newton glass surfaces.

9. The laser projection system of claim 1, wherein the randomizing optical element acts to reduce coherence artifacts in the projected laser light image.

* * * * *